T. Shanks,
Elevator.
No. 109,950. Patented Dec. 6, 1870.
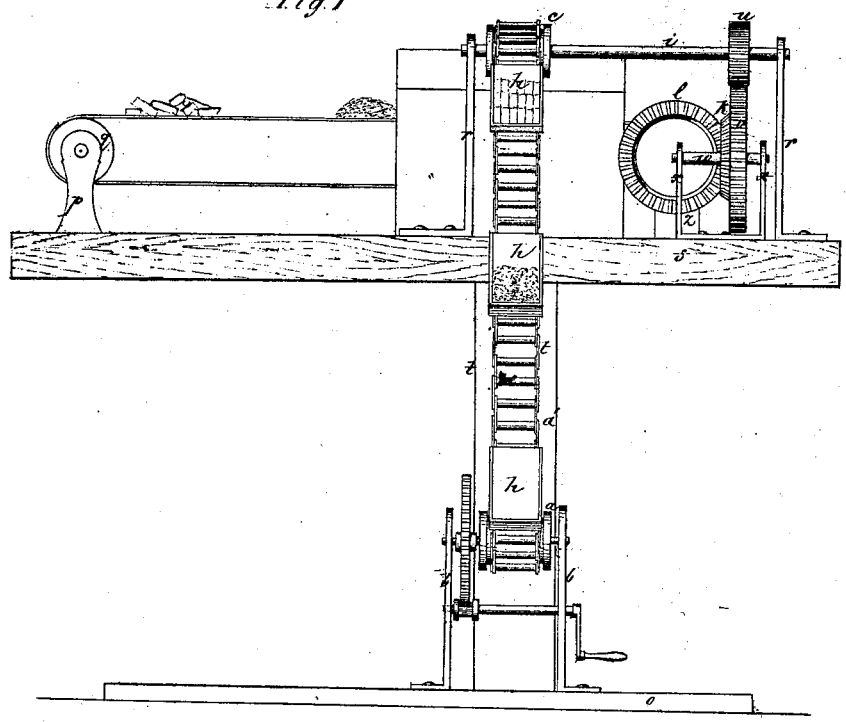
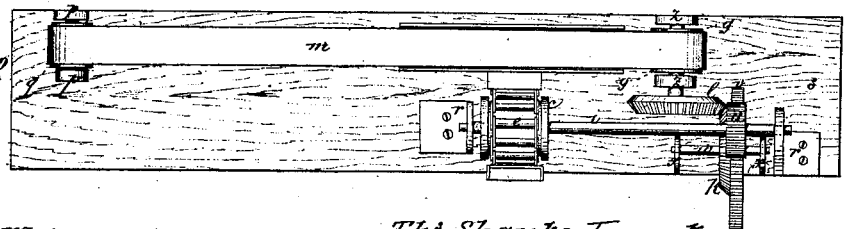

United States Patent Office.

THOMAS SHANKS, OF BALTIMORE, MARYLAND.

Letters Patent No. 109,950, dated December 6, 1870.

IMPROVEMENT IN ELEVATORS AND DISTRIBUTERS.

The Schedule referred to in these Letters Patent and making part of the same.

*To all whom it may concern:*

Be it known that I, THOMAS SHANKS, of the city and county of Baltimore, in the State of Maryland, have made certain new and useful Improvements in Machine for Elevating and Conveying Building Materials; and I do hereby declare the following to be a full, clear, and exact description of the same, reference being had to the accompanying drawing forming part of this specification.

Figure 1 is a side view; and
Figure 2 is a top view of the upper platform.
Similar letters of reference in the drawing indicate corresponding parts.

The object of this invention is to provide for public use a machine adapted to elevate or convey bricks, mortar, and other building materials from the ground to the place where they are to be used in the building by means of the power of one man applied at the surface of the ground.

This result I accomplish by the use of a machine especially constructed and adapted to this particular purpose, as hereinafter described, the essential parts of which are, first, an elevated projecting platform, designed, when in use, to rest at one end upon the wall of the unfinished building; secondly, a post or column supporting the platform at or near the outer end; thirdly, a suitable pedestal or base for the column, sufficiently extended transversely to the platform to prevent lateral swaying or insecurity of the latter; fourthly, elevating and conducting-belts, provided with hods or buckets for the materials to be raised; and, lastly, a suitable apparatus for enabling one man, standing at the base of the column, to put said belts in operation by hand or other power.

The invention consists, not in the use of any of these elements alone, but in the whole machine, constructed so as to combine and adapt them to the special purpose referred to.

In the drawing—

$s$ represents the elevated platform, supported eccentrically upon a column, $t$, so as to adapt the longer or projecting end of the platform to extend to and rest upon the unfinished wall of the building.

$o$ is a base or lower platform, resting on the ground at right angles with the upper platform, and supporting the column $t$.

$e$ is an endless vertical apron or belt, provided with hods or buckets, $h$ $h$, and extending from a point near the ground to a point over the upper platform.

$m$ is an endless horizontal apron operating upon the upper platform, and adapted to receive the bricks and mortar dumped upon it from the vertical apron, convey them along and deliver them from its projecting end to the place where they are wanted for use on the building.

$a$ $a$, $b$ $b$, and $r$ $r$ are the rollers and standards that support and operate the vertical apron;

$p$ $p$, $z$ $z$ are the standards; and $q$ $q'$, the rollers that support and operate the horizontal apron; and $u$ $v$ $w$ $k$ $l$ are the gear-wheels by which the movement of the vertical apron is communicated to the horizontal one.

The whole are so constructed, arranged, and combined that a workman standing at the base of post $t$ operates the vertical apron by means of a hand-crank or horse-power, and the motion of said apron communicated through the gear-wheels described is imparted to the horizontal apron, so that the materials placed in the hods by the workman below are delivered to his companions on the building as fast as wanted.

I am aware that a combination of vertical and horizontal aprons for the purpose of elevating, conveying, and discharging dirt has been used on excavators and similar machines. I do not claim the combination of said aprons; but What I do claim as my invention, and desire to secure by Letters Patent, is—

The machine herein described, consisting essentially of the base $o$, the column $t$, the platform $s$, arranged at right angles with the lower platform $o$ and projecting at one end so as to rest upon the wall of the building, the revolving aprons $m$ $e$, the connecting-gear $u$ $v$ $w$ $k$ $l$, and the operating wheel or drum $a$ at the foot of the vertical apron, all constructed and adapted to operate together, for the purposes specified, in the manner substantially as herein described.

THOMAS SHANKS.

Witnesses:
GEO. M. CAFFRAY,
J. S. MORROW.